US006944133B2

(12) United States Patent
Wisner et al.

(10) Patent No.: US 6,944,133 B2
(45) Date of Patent: Sep. 13, 2005

(54) SYSTEM AND METHOD FOR PROVIDING ACCESS TO RESOURCES USING A FABRIC SWITCH

(75) Inventors: Steven P. Wisner, Richmond, VA (US); James A. Campbell, Ashland, VA (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 831 days.

(21) Appl. No.: 09/845,215

(22) Filed: May 1, 2001

(65) Prior Publication Data

US 2002/0163910 A1 Nov. 7, 2002

(51) Int. Cl.[7] .................................................. H04L 12/26
(52) U.S. Cl. ........................................ 370/242; 709/217
(58) Field of Search ................................ 370/216, 218, 370/221, 235, 242, 245, 389, 392, 428, 223, 236, 412, 420, 429; 709/217, 218, 219

(56) References Cited

U.S. PATENT DOCUMENTS

| | | | | |
|---|---|---|---|---|
| 5,293,488 A | | 3/1994 | Riley | |
| 5,544,347 A | | 8/1996 | Yanai et al. | |
| 5,633,999 A | * | 5/1997 | Clowes et al. | 714/40 |
| 5,948,062 A | | 9/1999 | Tzelnic et al. | |
| 5,987,621 A | | 11/1999 | Duso et al. | |
| 6,078,503 A | | 6/2000 | Gallagher et al. | |
| 6,151,665 A | | 11/2000 | Blumenau | |
| 6,173,377 B1 | | 1/2001 | Yanai et al. | |
| 6,192,408 B1 | | 2/2001 | Vahalia et al. | |
| 6,411,991 B1 | | 6/2002 | Helmer et al. | |
| 6,578,160 B1 | * | 6/2003 | MacHardy et al. | 709/223 |
| 6,718,481 B1 | * | 4/2004 | Fair | 709/224 |

OTHER PUBLICATIONS

PCT–International Search Report dated Jan. 2, 2003 for Application No. PCT/US02/13613, filed May 1, 2002.

EMC[2]—EMC Celerra File Server Production Description Guide 2001 pp. 1–49.

EMC[2]—Backup Solutions for the Celerra File Server Sep. 2000 pp. 1–6.

EMC[2]—Cisco Systems and EMC, Delivering Mission–Critical Data Replication over a Highly Available IP Network Infrastructure Mar. 2001 pp. 1–9.

EMC[2]—What's Going on Inside the Box?, ISV Access Symmetrix Performance and Utilization Metrics Jan. 2000 pp. 1–12.

EMC[2]—Celerra File Server in the E–Infostructure Sep. 2000 pp. 1–9.

EMC[2]—Oracle, No Data Loss Standby Database, The benefits of combining EMC Symmetrix Remote Data Facility (SRDF) WITH Oracle8i Automated Standby Database Feb. 2001 pp. 1–18.

(Continued)

*Primary Examiner*—Chi Pham
*Assistant Examiner*—Anh-Vu H Ly
(74) *Attorney, Agent, or Firm*—Hunton & Williams

(57) ABSTRACT

A system and method for accessing resources includes first and second data centers located at first and second respective geographic locations. The first center include a first file server and first data storage unit, while the second data center includes a second file server and second data storage unit. In one embodiment, the first data storage unit includes active resources designated for active use, while the second data storage unit includes standby resources designated for standby use in the event that the active resources are not available. A switch fabric and associated intelligent controller communicatively couple the first file server, the first data storage unit, the second file server, and the second data storage unit. The intelligent controller may route information through the switch in multiple different ways deemed appropriate in view of the failure conditions that affect the system.

19 Claims, 5 Drawing Sheets

OTHER PUBLICATIONS

EMC[2]—Oracle7 and EMC Symmetrix Remote Data Facility (SRDF) Nov. 1996 pp. 1–22, T1–T10.
EMC[2]—EMC and Cisco Systems Network Attached Storage Solutions, Defining a High–Availability Topology Jan. 2001 pp. 1–10.
EMC[2]—SRDF Celerra Server Sep. 2000 p. 1–5.
Brocade Brocade SAN Solutions: A More Effective Approach To Information Storage And Management (2000) pp. 1–15.
Database Administration: Hot Standby For Rdb Systems Dr. Lilian Hobbs <http://www.oracle.com/rdb/product_info/html_documents/hotstdby.html> printed Apr. 6, 2001.
Data Sheet DistributedDirector for Cisco 7200 Series Routers pp. 1–1 to 1–11.
Brocade The Essential Elements Of A Storage Networking Architecture (2001) p. 1–13.
EMC[2]—Celerra File Server Architecture for High Availability Aug. 1999 pp. 1–7.
Brocade Increasing Intelligence Within The SAN Fabric (2001) pp. 1–8.

* cited by examiner

SYSTEM AND METHOD FOR PROVIDING ACCESS TO RESOURCES USING A FABRIC SWITCH

BACKGROUND OF THE INVENTION

The present invention generally relates to a system and method for providing access to resources. In a more specific embodiment, the present invention relates to a system and method for providing access to network-accessible resources in a storage unit using a fabric switch.

Modern network services commonly provide a large centralized pool of data in one or more data storage units for shared use by various network entities, such as users and application servers accessing the services via a wide area network (WAN). These services may also provide a dedicated server for use in coordinating and facilitating access to the data stored in the storage units. Such dedicated servers are commonly referred to as "file servers," or "data servers."

Various disturbances may disable the above-described file servers and/or data storage units. For instance, weather-related and equipment-related failures may result in service discontinuance for a length of time. In such circumstances, users may be prevented from accessing information from the network service. Further, users that were logged onto the service at the time of the disturbance may be summarily "dropped," sometimes in midst of making a transaction. Needless to say, consumers find interruptions in data accessibility frustrating. From the perspective of the service providers, such disruptions may lead to the loss of clients, who may prefer to patronize more reliable and available sites.

For these reasons, network service providers have shown considerable interest in improving the reliability of network services. One known technique involves simply storing a duplicate of a host site's database in an off-line archive (such as a magnetic tape archive) on a periodic basis. In the event of some type of major disruption of service (such as a weather-related disaster), the service administrators may recreate any lost data content by retrieving and transferring information from the off-line archive. This technique is referred to as "cold backup" because the standby resources are not immediately available for deployment. Another known technique entails mirroring the content of the host site's active database in a back-up network site. In the event of a disruption, the backup site assumes the identity of the failed host site and provides on-line resources in the same manner as would the host site. Upon recovery of the host site, this technique may involve redirecting traffic back to the recovered host site. This technique is referred to as "warm backup" because the standby resources are available for deployment with minimal setup time.

The above-noted solutions are not fully satisfactory. The first technique (involving physically installing backup archives) may require an appreciable amount of time to perform (e.g., potentially several hours). Thus, this technique does not effectively minimize a user's frustration upon being denied access to a network service, or upon being "dropped" from a site in the course of a communication session. The second technique (involving actively maintaining a redundant database at a backup web site) provides more immediate relief upon the disruption of services, but may suffer other drawbacks. For instance, modern host sites may employ a sophisticated array of interacting devices, each potentially including its own failure detection and recovery mechanisms. This infrastructure may complicate the coordinated handling of failure conditions. Further, a failure may affect a site in a myriad of ways, sometimes disabling portions of a file server, sometimes disabling portions of the data storage unit, and other times affecting the entire site. The transfer of services to a backup site represents a broad-brush approach to failure situations, and hence may not utilize host site resources in an intelligent and optimally productive manner.

Known efforts to improve network reliability and availability may suffer from additional unspecified drawbacks.

Accordingly, there is a need in the art to provide a more effective system and method for ensuring the reliability and integrity of network resources.

BRIEF SUMMARY OF THE INVENTION

The disclosed technique solves the above-identified difficulties in the known systems, as well as other unspecified deficiencies in the known systems.

According to one exemplary embodiment, the present invention pertains to a system for providing access to resources including at least a first and second data centers. The first data center provides a network service at a first geographic location, and includes a first file server for providing access to resources, and a first data storage unit including active resources configured for active use. The second data center provides the network service at a second geographic location, and includes a second file server for providing access to resources, and a second data storage unit including standby resources configured for standby use in the event that the active resources cannot be obtained from the first data storage unit. The system further includes a switching mechanism for providing communicative connectivity to the first file server, second file server, first data storage unit, and second data storage unit. The system further includes failure sensing logic for sensing a failure condition in at least one of the first and second data centers, and generating an output based thereon. The system further includes an intelligent controller coupled to the switching mechanism for controlling the flow of data through the switching mechanism, and for coordinating fail operations, based on the output of the failure sensing logic.

In another exemplary embodiment, the intelligent controller includes logic for coupling the first file server to the second data storage unit when a failure condition is detected pertaining to the first data storage unit.

In another exemplary embodiment, the switching mechanism comprises a fiber-based fabric switch.

In another exemplary embodiment, the switching mechanism comprises a WAN-based fabric switch.

In another exemplary embodiment, the present invention pertains to a method for carrying out the functions described above.

As will be set forth in the ensuing discussion, the use of a fabric switch 124 in conjunction with an intelligent controller provides a highly flexible and coordinated technique for handling failure conditions within a network infrastructure, resulting in an efficient utilization of standby resources.

BRIEF DESCRIPTION OF THE DRAWINGS

Still further features and advantages of the present invention are identified in the ensuing description, with reference to the drawings identified below, in which.

DETAILED DESCRIPTION OF THE INVENTION

Figure 1:
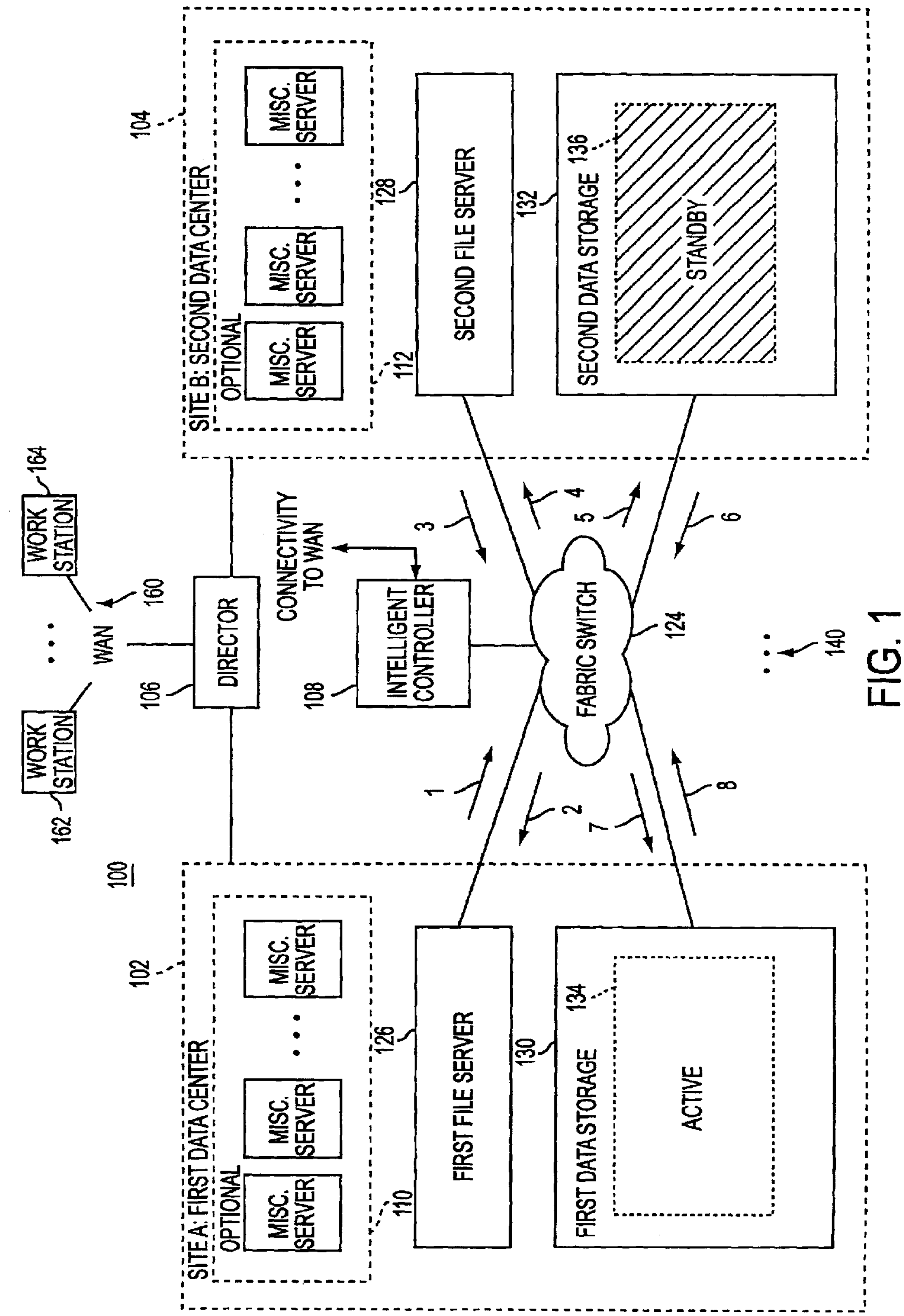
FIG. 1 shows an exemplary system for implementing the invention using at least two data centers, a fabric switch and an intelligent controller.

FIG. 1 shows an overview of an exemplary system architecture 100 for implementing the present invention. The architecture 100 includes data center 102 located at site A and data center 104 located at site B. Further, although not shown, the architecture 100 may include additional data centers located at respective different sites (as generally represented by the dashed notation 140). Generally, it is desirable to separate the sites by sufficient distance so that a region-based failure affecting one of the data centers will not affect the other. In one exemplary embodiment, for instance, site A is located between 30 and 300 miles from site B.

A network 160 communicatively couples data center 102 and data center 104 with one or more users operating data access devices (such as exemplary workstations 162, 164). In a preferred embodiment, the network 160 comprises a wide-area network supporting TCP/IP traffic (i.e., Transmission Control Protocol/Internet Protocol traffic). In a more specific preferred embodiment, the network 160 comprises the Internet or an intranet, etc. In other applications, the network 160 may comprise other types of networks governed by other types of protocols.

The network 160 may be formed, in whole or in part, from hardwired copper-based lines, fiber optic lines, wireless connectivity, etc. Further, the network 160 may operate using any type of network-enabled code, such as HyperText Markup Language (HTML), Dynamic HTML, Extensible Markup Language (XML), Extensible Stylesheet Language (XSL), Document Style Semantics and Specification Language (DSSSL), Cascading Style Sheets (CSS), etc. In use, one or more users may access the data centers 102 or 104 using their respective workstations (such as workstations 162 and 164) via the network 160. That is, the users may gain access in a conventional manner by specifying the assigned network address (e.g., website address) associated with the service.

The system 100 further includes a director 106. The director 106 receives a request from a user to log onto the service and then routes the user to an active data center, such as data center 102. If more than one data center is currently active, the director 106 may use a variety of metrics in routing requests to one of these active data centers. For instance, the director 106 may grant access to the data centers on a round-robin basis. Alternatively, the director 106 may grant access to the data centers based on their assessed availability (e.g., based on the respective traffic loads currently being handled by the data centers). Alternatively, the director 106 may grant access to the data centers based on their geographic proximity to the users. Still further efficiency-based criteria may be used in allocating log-on requests to available data centers.

The director 106 may also include functionality, in conjunction with the intelligent controller 108 (to be discussed below), for detecting a failure condition in a data center currently handling a communication session, and for redirecting the communication session to another data center. For instance, the director 106 may, in conjunction with the intelligent controller 108, redirect a communication session being handled by the first data center 102 to the second standby data center 104 when the first data center 102 becomes disabled.

Data center 102 may optionally include a collection 110 of servers for performing different respective functions. Similarly, data center 104 may optionally include a collection 112 of servers also for performing different respective functions. Exemplary servers for use in these collections (110, 112) include web servers, application servers, database servers, etc. As understood by those skilled in the art, web servers handle the presentation aspects of the data centers, such as the presentation of static web pages to users. Application servers handle data processing tasks associated with the application-related functions performed by the data centers. That is, these servers include business logic used to implement the applications. Database-related servers may handle the storage and retrieval of information from one or more databases contained within the centers' data storage units.

Each of the above-identified servers may include conventional head-end processing components (not shown), including a processor (such as a microprocessor), memory, cache, and communication interface, etc. The processor serves as a central engine for executing machine instructions. The memory (e.g., RAM, ROM, etc.) serves the conventional role of storing program code and other information for use by the processor. The communication interface serves the conventional role of interacting with external equipment, such as the other components in the data centers.

In one exemplary embodiment, the servers located in collections 110 and 112 are arranged in a multi-tiered architecture. More specifically, in one exemplary embodiment, the servers located in collections 110 and 112 include a three-tier architecture including one or more web servers as a first tier, one or more application servers as a second tier, and one or more database servers as a third tier. Such an architecture provides various benefits over other architectural solutions. For instance, the use of the three-tier design improves the scalibility, performance and flexibility (e.g., reusability) of system components. The three-tier design also effectively "hides" the complexity of underlying layers of the architecture from users.

In addition, although not shown, the arrangement of servers in the first and second data centers may include a first platform devoted to staging, and a second platform devoted to production. The staging platform is used by system administrators to perform back-end tasks regarding the maintenance and testing of the network service. The production platform is used to directly interact with users that access the data center via the network 160. The staging platform may perform tasks in parallel with the production platform without disrupting the on-line service, and is beneficial for this reason.

In another exemplary embodiment, the first and second data centers (102, 104) may entirely exclude the collections (110, 112) of servers.

Figure 3:
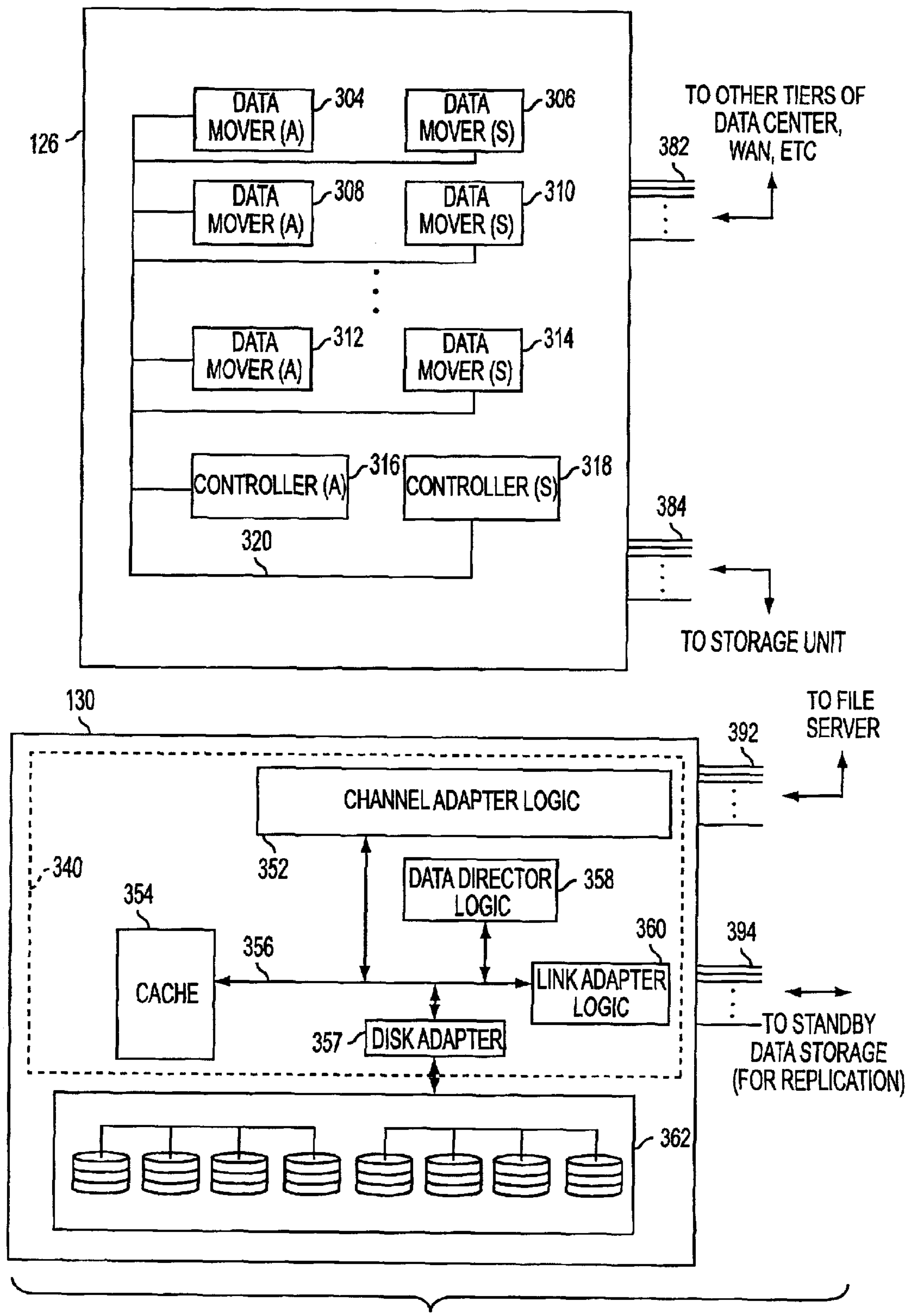
FIG. 3 shows a more detailed exemplary construction of one of the file servers and associated data storage unit shown in FIG. 1.

The first data center 102 also includes first file server 126 and first data storage unit 130. Similarly, the second data center 104 includes second file server 128 and second data storage unit 132. The prefixes "first" and "second" here designate that these components are associated with the first and second data centers, respectively. The file servers (126,

128) coordinate and facilitate the storage and retrieval of information from the data storage units (130, 132). According to exemplary embodiments, the file servers (126, 128) may be implemented using Celerra file servers produced by EMC Corporation, of Hopkinton, Mass. The data storage units (130, 132) store data in one or more storage devices. According to exemplary embodiments, the data storage units (130, 132) may be implemented by Symmetrix storage systems also produced by EMC Corporation. FIG. 3 (discussed below) provides further details regarding an exemplary implementation of the file servers (126, 128) and data storage units (130, 132).

In one embodiment, the first data center 102 located at site A contains the same functionality and database content as the second data center 104 located at site B. That is, the application servers in the collection 110 of the first data center 102 include the same business logic as the application servers in the collection 112 of the second data center 104. Further, the first data storage unit 130 in the first data center 102 includes the same database content as the second data storage unit 132 in the second data center 104. In alternate embodiments, the first data center 102 may include a subset of resources that are not shared with the second data center 104, and vice versa. The nature of the data stored in data storage units (130, 132) varies depending on the specific applications provided by the data centers. Exemplary data storage units may store information pertaining to user accounts, product catalogues, financial tables, various graphical objects, etc.

In the embodiment shown in FIG. 1, the system 100 designates the data content 134 of data storage unit 130 as active resources. On the other hand, the system 100 designates the data content 136 of the data storage unit 132 as standby resources. Active resources refer to resources designated for active use (e.g., immediate and primary use). Standby resources refer to resources designated for standby use in the event that active resources cannot be obtained from another source.

In one embodiment, the second data storage unit 132 serves primarily as a backup for use by the system 100 in the event that the first data center 102 fails, or a component of the first data center 102 fails. In this scenario, the system 100 may not permit users to utilize the second data storage unit 132 while the first data center 102 remains active. In another embodiment, the system 100 may configure the second data storage unit 132 as a read-only resource; this would permit users to access the second data storage unit 132 while the first data center 102 remains active, but not change the content 136 of the second data storage unit 132.

In still another embodiment (not illustrated), the first data storage unit 130 may include both active and standby portions. The second data storage unit 132 may likewise include both active and standby portions. In this embodiment, the standby portion of the second data center 104 may serve as the backup for the active portion of the first data center 102. In similar fashion, the standby portion of the first data center 102 may serve as the backup for the active portion of the second data center 104. This configuration permits both the first and second data centers to serve an active role in providing service to the users (by drawing from the active resources of the data centers' respective data storage units). For this reason, such a system 100 may be considered as providing a "dual hot site" architecture. At the same time, this configuration also provides redundant resources in both data centers in the event that either one of the data centers should fail (either partially or entirely).

The data centers may designate memory content as active or standby using various technologies and techniques. For instance, a data center may define active and standby instances corresponding to active and standby resources, respectively.

Further, the data centers may use various techniques for replicating data to ensure that changes made to one center's data storage unit are duplicated in the other center's data storage unit. For instance, the data centers may use Oracle Hot Standby software to perform this task, e.g., as described at <<http://www/oracle.com/rdb/product_ino/html_documents/hotstdby.html>>. In this service, an ALS module transfers database changes to its standby site to ensure that the standby resources mirror the active resources. In one scenario, the first data center 102 sends modifications to the standby site and does not follow up on whether these changes were received. In another scenario, the first data center 102 waits for a message sent by the standby site that acknowledges receipt of the changes at the standby site. The system 100 may alternatively use EMC's SRDF technology to coordinate replication of data between the first and second data centers (102, 104), which is based on a similar paradigm.

A switch mechanism 124 (hereinafter referred to as "fabric switch" 124) in conjunction with an intelligent controller 108 provide coupling between the first file server 126, the first data storage unit 130, the second file server 128, and the second data storage unit 132. The fabric switch 124 comprises a mechanism for routing data between at least one source node to at least one destination node using at least one intermediary switching device. The communication links used within the fabric switch 124 may comprise fiber communication links, copper-based links, wireless links, etc., or a combination thereof. The switching devices may comprise any type of modules for performing a routing function (such as storage array network (SAN) switching devices produced by Brocade Communications Systems, Inc., of San Jose, Calif.).

The fabric switch 124 may encompass a relatively local geographic area (e.g., within a particular business enterprise). In this case, the fabric switch 124 may primarily employ high-speed fiber communication links and switching devices. Alternatively, the fabric switch 124 may encompass a larger area. For instance, the fabric switch 124 may include multiple switching devices dispersed over a relatively large geographic area (e.g., a city, state, region, country, worldwide, etc.). Clusters of switching devices in selected geographic areas may effectively form "sub-fabric switches." For instance, one or more data centers may support sub-fabric switches at their respective geographic areas (each including or more switching devices). The intelligent controller 108 may also support a management-level sub-fabric switch that effectively couples all of the sub-fabrics together.

Various protocols may be used to transmit information over the fabric switch 124. For instance, in one embodiment the switch 124 may comprise a wide area network-type fabric switch that includes links and logic for transmitting information using various standard WAN protocols, such as Asynchronous Transfer Mode, IP, Frame Relay, etc.). In this case, the fabric switch 124 may include or more conversion modules to convert signals between various formats. More specifically, such a fabric switch 124 may include one or more conversion modules for encapsulating data from fiber-based communication links into Internet-compatible data packets for transmission over a WAN. One exemplary device capable of performing this translation is the Computer Network Technologies (CNT) UltraNet Storage Director produced by Computer Network Technologies of Minneapolis, Minn. Further, in another embodiment, the fabric switch 124 may share resources with the WAN 160 in providing wide-area connectivity.

According to one feature, the fabric switch 124 may serve a traffic routing role in the system 100. That is, the fabric switch 124 may receive instructions from the intelligent controller 108 to provide appropriate connectivity between first file server 126, the first data storage unit 130, the second file server 128, and the second data storage unit 132. More specifically, a first route, formed by a combination of paths labeled (1) and (7), provides connectivity between the first file server 126 and the first data storage unit 130. The system 100 may use this route by default (e.g., in the absence of a detected failure condition affecting the first data center 102). A second route, formed by a combination of paths labeled (1) and (5), provides connectivity from the first file server 126 to the second data storage unit 132. The system 100 may use this route when a failure condition is detected which affects the first file server 126. A third route, formed by a combination of paths labeled (8) and (5), provides connectivity from the first data storage unit 130 to the second data storage unit 132. The system 100 may use this route to duplicate changes made to the first data storage unit 130 in the second data storage unit 132. Other potential routes through the network may comprise the combination of paths (1) and (4), the combination of paths (3) and (2), the combination of paths (6) and (7), the combination of paths (8) and (2), the combination of paths (6) and (4), etc.

In alternative embodiments, one or more of the above-identified routes may be implemented using a separate coupling link that does not rely on the resources of the fabric switch 124. In another embodiment, the fabric switch 124 may couple additional components within the first and second data centers, and/or other "external" entities.

According to another feature, the fabric switch 124 may provide a mechanism by which the intelligent controller 108 may receive failure detection information from the centers' components. Further, the intelligent controller 108 may transmit control instruction to various components in the first and second data centers via the fabric switch 124, to thereby effectively manage fail over operations. Alternatively, or in addition, the intelligent controller is also coupled to the WAN 160, through which it may transmit instructions to the data centers, and/or receive failure condition information therefrom.

For instance, in the event that the first data storage unit 130 becomes disabled, the intelligent controller 108 may transmit an instruction to the fabric switch 124 that commands the fabric switch 124 to establish a route from the first file server 126 to the second data storage 132, e.g., formed by a combination of paths (1) and (5) These instructions may take the form of a collection of switching commands transmitted to effected switching devices within the fabric switch 124. In the above scenario, the intelligent controller 108 may also instruct the second data storage unit 132 to activate the standby resources 136 in the second data storage 132. Alternatively, in this scenario, the intelligent controller 108 may instruct the second file server 128 and its associated second data storage 132 to completely take over operation for the first data center 102.

Figure 2:
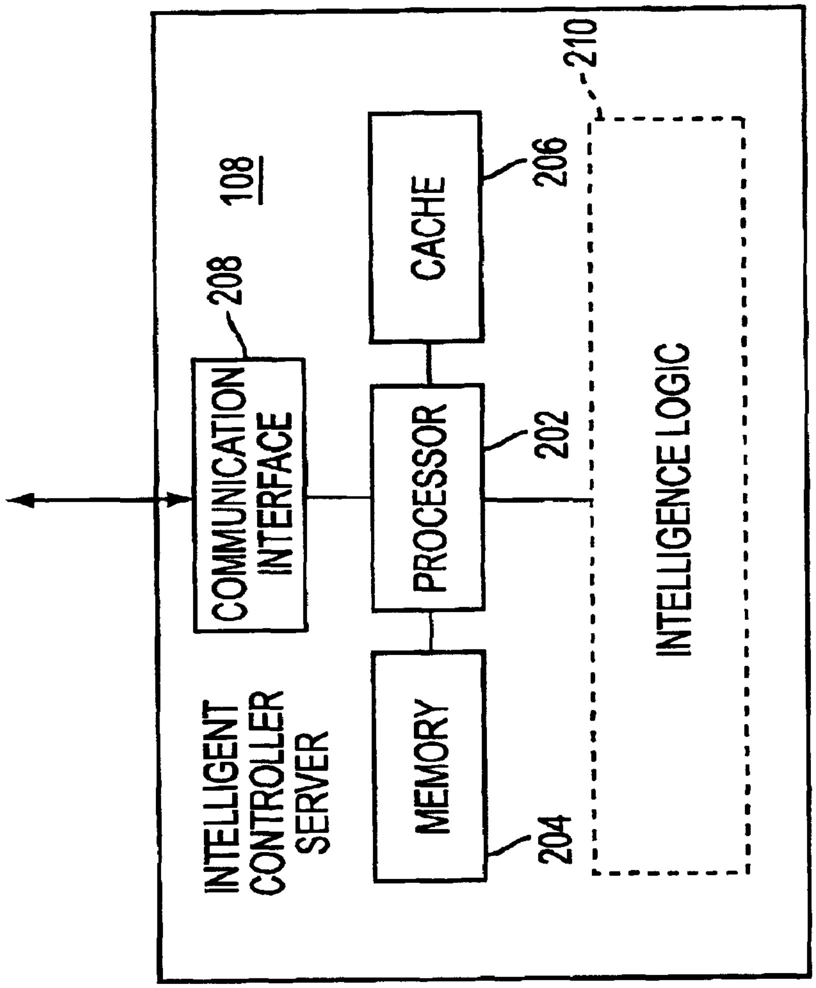
FIG. 2 shows an exemplary construction of an intelligent controller for use in the system of FIG. 1.

The intelligent controller 108 may comprise any type of module for performing a controlling function, including discrete logic circuitry, one or more programmable processing modules, etc. For instance, FIG. 2 shows the exemplary implementation of the intelligent controller 108 as a special-purpose server coupled to the WAN 160. In general, the intelligent controller 108 may include conventional hardware, such as a processor 202 (or plural processors), a memory 204, cache 206, and a communication interface 208. The processor 202 serves as a primary engine for executing computer instructions. The memory 204 (such as a Random Access Memory, or RAM) stores instructions and other data for use by the processor 202. The cache 206 serves the conventional function of storing information likely to be accessed in a high-speed memory. The communication interface 208 allows the intelligent controller 108 to communicate with external entities, such as various entities coupled to the network 160. The communication interface 208 also allows the intelligent controller 108 to provide instructions to the fabric switch 124. The intelligent controller 108 may operate using various known software platforms, including, for instance, Microsoft Windows™ NT™, Windows™ 2000, Unix™, Linux, Xenix™, IBM AIX™, Hewlett-Packard UX™, Novell Netware™, Sun Microsystems Solaris™, OS/2™, BeOS™, Mach, OpenStep™, or other operating system or platform.

The intelligent controller 108 also includes various program functionality 210 for carrying out its ascribed functions. Such functionality 210 may take the form of machine instructions that perform various routines when executed by the processor unit 202. For instance, the functionality 210 may include routing logic which allows the intelligent controller 108 to formulate appropriate instructions for transmission to the fabric switch 124. In operation, the functionality 202 receives information regarding failure conditions, analyzes such information, and provides instructions to the fabric switch 124 based on such analysis. Additional detail regarding this monitoring, analysis, and generation of instructions are described below with reference to FIG. 4.

Although not shown, the intelligent controller 108 may also include a database. The database may store various information having utility in performing routing (such as various routing tables, etc.), as well as other information appropriate to particular application contexts. Such a database may be implemented using any type of storage media. For instance, it can comprise a hard-drive, magnetic media (e.g., discs, tape), optical media, etc. The database may comprise a unified storage repository located at a single site, or may represent multiple repositories coupled together in distributed fashion.

FIG. 3 shows an exemplary file server 126 and associated data storage unit 130 of the first data center 102. Although not illustrated, the second data center 104 includes the same infrastructure shown in FIG. 3.

The file server 126 includes a plurality of processing modules (304, 306, 308, 310, 312, 314, 316, 318, etc.). A first subset of processing modules (304, 306, 308, 310, 312, and 314) function as individual file servers which facilitate the storage and retrieval of data from the data storage unit 130. These processing modules are referred to as "data movers." The data movers (304–314) may be configured to serve respective file systems stored in the data storage unit 130. A second subset of processing modules (316, 318) function as administrative controllers for the file server 126, and are accordingly referred to as "controllers." Namely, the controllers (316, 318) configure and upgrade the respective memories of the data movers, and perform other high-level administrative or control-related tasks. Otherwise, however, the data movers (304–314) operate largely independent of the controllers (316, 318).

In one embodiment, a single cabinet may house all of the processing modules. The cabinet may include multiple slots (e.g., compartments) for receiving the processing modules by sliding the processing modules into the slots. When engaged in the cabinet, a local network 320 (such as an Ethernet network) may couple the controllers (314, 318) to the data movers (304–314). Further, the cabinet may include a self-contained battery, together with one or more battery chargers.

Each processing module may include a processor (e.g., a microprocessor), Random Access Memory (RAM), a PCI and/or EISA bus, and various I/O interface elements (e.g., provided by interface cards). These interface elements (not shown) permit various entities to interact with the file server 126 using different types of protocols, such as Ethernet, Gigabit Ethernet, FDDI, ATM, etc. Such connectivity is generally represented by links 382 shown in FIG. 3. Other interface elements (not shown) permit the file server 126 to communicate with the data storage unit 130 using different types of protocols, such as SCSI or fiber links. Such connectivity is generally represented by links 384 shown in FIG. 4.

The file server 126 may configure a subset of the data movers to serve as "active" data movers (e.g., 304, 308, 312, and 316), and a subset to act as "standby" data movers (e.g., 306, 310, 314, and 318). The active data movers have the primary responsibility for interacting with respective file systems in the data storage unit during the normal operation of the file server 126. The standby data movers interact with respective file systems when their associated active data movers become disabled. More specifically, control logic within the intelligent controller 108 (or other appropriate managing agent) may monitor the heartbeat of the active data movers, e.g., by transmitting a query message to the active data movers. Upon failing to receive a response from an active data mover (or upon receiving a response that is indicative of a failure condition), the control logic activates the standby data mover corresponding to the disabled active data mover. For example, in one embodiment, the file server 126 may include six active data movers and an associated six standby data movers. That is, as shown in FIG. 2, data mover 306 functions as the standby for active data mover 304, data mover 310 functions as the standby for active data mover 308, data mover 314 functions as the standby for active data mover 312, etc. In other applications, a designer may opt to configure the data movers in a different manner.

The file server 126 may also include redundant controllers. For example, as shown in FIG. 2, file server 126 includes an active controller 316 and a standby controller 318. The controller 318 takes over control of the file server 126 in the event that the active controller 316 becomes disabled.

As mentioned above, the second data center 104 (not shown in FIG. 3) includes a second file server 128 and second data storage unit 132 including the same configuration as the first file server 126 and the first data storage unit 130, respectively. That is, the second file server 128 also includes a plurality of data movers and controllers. In one embodiment, data movers within the second file server 128 may also function as standby data movers for respective active data movers in the first file server 126. In this embodiment, upon the occurrence of a failure in an active data mover in the first file server 126, the intelligent controller 108 (or other appropriate managing agent) may first attempt to activate an associated standby data mover in the first file server 126. In the event that the assigned standby data mover in the first file server 126 is also disabled (or later becomes disabled), the intelligent controller 108 (or other appropriate managing agent) may attempt to activate an associated data mover in the second file server 128. Activating a standby data mover in the second file server 128 involves configuring the standby data mover such that it assumes the identity of the failed data mover in the first file server 126 (e.g., by configuring the standby data mover to use the same network addresses associated with the disabled active data mover in the first file server 126). Activating a standby data mover may also entail activating the standby data resources stored in the second data storage unit 132 (e.g., by changing the status of such contents from standby state to active state). The intelligent controller 108 (or other appropriate managing agent) may coordinate these fail over tasks.

The data storage unit 130 includes a controller 340 and a set of storage devices 362 (e.g., disk drives, optical disks, CD's, etc.). The controller 340 includes various logic modules coupled to an internal bus 356 for controlling the routing of information between the storage devices 362 and the file server 126. Namely, the controller 340 includes channel adapter logic 352 for interfacing with the file server 126 via interface links 392. As mentioned above, the data storage unit 130 may interface with the file server 126 via the fabric switch 124. The controller 340 further includes a disk adapter 357 for interfacing with the storage devices 362. The controller 340 further includes cache memory 354 for temporarily storing information transferred between the file server 126 and the storage devices 362. The controller 340 further includes data director logic 358 for executing one or more sets of predetermined micro-code to control data transfer between the file server 126, cache memory 354, and the storage devices 362.

The controller 340 also includes link adapter logic 360 for interfacing with the second data storage unit 132 for the purpose of replicating changes made in the first data storage unit 130 unit in the second data storage unit 132. More specifically, this link adapter logic 360 may interface with the second data storage unit 132 via fiber, T3, or other type of link (e.g., generally represented in FIG. 3 as links 394). In one embodiment, the first data storage unit 130 may transmit this replication information to the second data storage unit 132 via the fabric switch 124. In another embodiment, the first data storage unit 130 may transmit this information through an independent communication route. Transmitting replication information to the second data storage unit 132 ensures that the standby resources mirror the active resources, and thus may be substituted therefor in the event of a failure without incurring a loss of data.

The first data storage unit 130 may use various techniques to ensure that the second data storage unit 132 contains a mirror copy of its own data. As mentioned above, in a first technique, the first data storage unit 130 transmits replication information to the second data storage unit 132 via the communication lines 394, and then waits to receive an acknowledgment from the second data storage unit 132 indicating that it received the information. In this technique, the first file server 130 does not consider a transaction completed until the second data storage unit 132 acknowledges receipt of the transmitted information. In a second technique, the first data storage unit 130 considers a transaction complete as soon as it transmits replication information to the second data storage unit 132.

Generally, further details regarding an exemplary file server and associated data storage for application in the present invention may be found in U.S. Pat. Nos. 5,987,621, 6,078,503, 6,173,377, and 6,192,408, all of which are incorporated herein by reference in their respective entireties.

Figure 4:
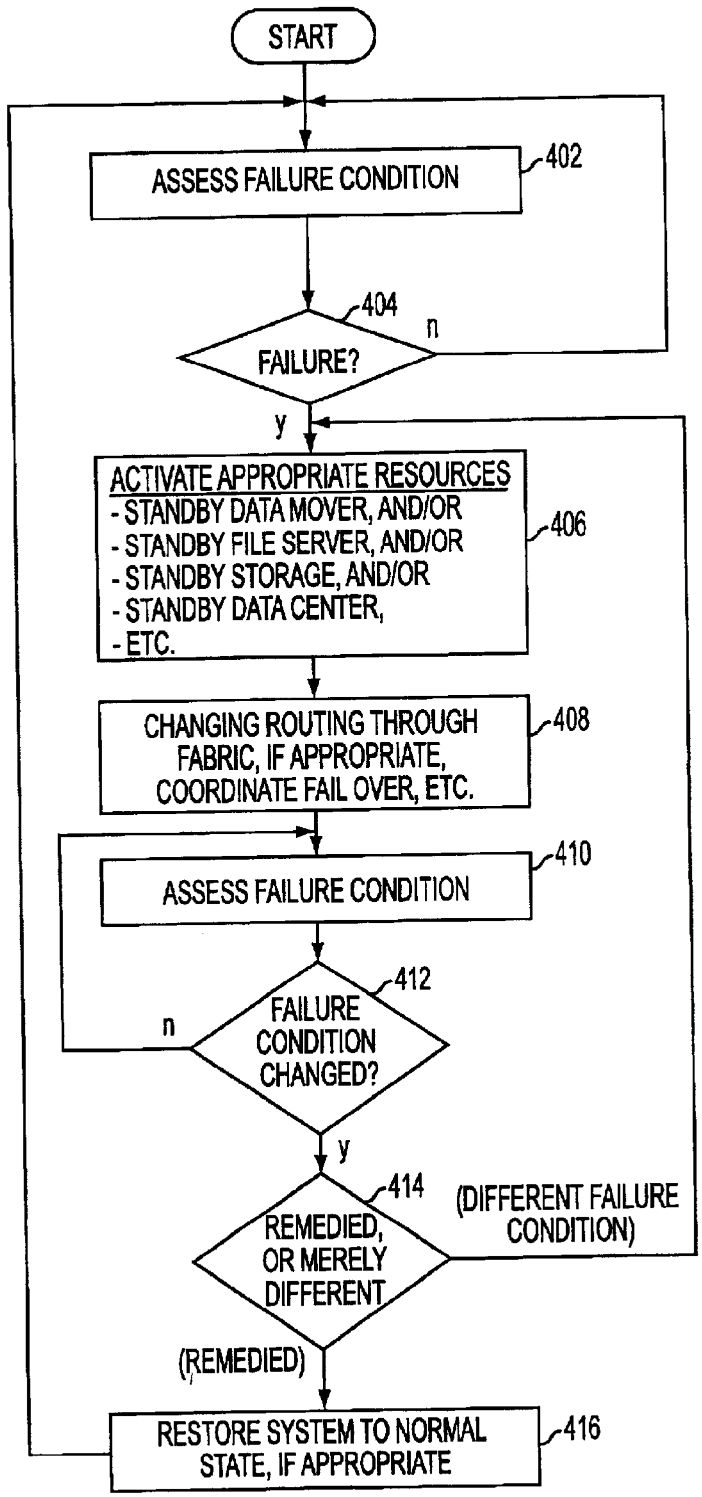
FIG. 4 describes an exemplary process flow for handling various failure conditions in the system of FIG. 1.

FIG. 4 illustrates how the system 100 reacts to different failure conditions. In general, this flowchart explains actions performed by the system 100 shown in FIG. 1 in an ordered sequence of steps primarily to facilitate explanation of exemplary basic concepts involved in the present invention. However, in practice, selected steps may be performed in a different sequence than is illustrated in these figures. Alternatively, the system 100 may execute selected steps in parallel.

In step 402, the intelligent controller 108 (or other appropriate managing agent) determines whether failure conditions are present in the system 100. Such a failure may indicate that a component of the first data center 102 has become disabled (such as a data mover, data storage module, etc.), or the entirety of the first data center 102 has become disabled. Various events may cause such a failure, including equipment failure, weather disturbances, traffic overload situations, etc.

The system 100 may detect system failure conditions using various techniques. In one embodiment, the system 100 may employ multiple monitoring agents located at various levels in the network infrastructure to detect error conditions and feed such information to the intelligent controller 108. For instance, various "layers" within a data center may detect malfunction within their respective layers, or within other layers with which they interact. Further, agents which are external to the data centers (such as external agents connected to the WAN network 160) may detect malfunction of the data centers.

Commonly, these monitoring agents assess the presence of errors based on the inaccessibility (or relatively inaccessibility) of resources. For instance, a typical heartbeat monitoring technique may transmit a message to a component and expect an acknowledgment reply therefrom in a timely manner. If the monitoring agent does not receive such a reply (or receives a reply indicative of an anomalous condition), it may assume that the component has failed. Those skilled in the art will appreciate that a variety of monitoring techniques may be used depending on the business and technical environment in which the invention is deployed. In alternative embodiments, for instance, the monitoring agents may detect trends in monitored data to predict an imminent failure of a component or an entire data center.

FIG. 4 shows that the assessment of failure conditions may occur at a particular juncture in the processing performed by the system 100 (e.g., at the juncture represented by step 402). But in other embodiments, the monitoring agents assess the presence of errors in an independent fashion in parallel with other operations performed by the system 100. Thus, in this scenario, the monitoring agents may continually monitor the infrastructure for the presence of error conditions.

If a failure has occurred, as determined in step 404, the intelligent controller 108 (or other appropriate managing agent) activates appropriate standby resources (in step 406). More specifically, the intelligent controller 108 (or other appropriate managing agent) may opt to activate different modules of the system 100 depending on the nature and severity of the failure condition. In a first scenario, the intelligent controller 108 (or other appropriate managing agent) may receive information indicating that an active data mover has failed. In response, the intelligent controller 108 (or other appropriate managing agent) may coordinate the fail over to a standby data mover in the first file server. Alternatively, if this standby data mover is also disabled, the intelligent controller 108 (or other appropriate managing agent) may coordinate the fail over to a standby data mover in the second data center 104. This may be performed by configuring the remote data mover to assume the identity of the failed data mover in the first data center 102 (e.g., by assuming the data mover's network address).

In a second scenario, the intelligent controller 108 (or other appropriate managing agent) may receive information indicating that the entire first file server 126 has failed. In response, the intelligent controller 108 (or other appropriate managing agent) activates the entire second file server 128 of the second data center 104. This may be performed by configuring the second file server 128 to assume the identity of the failed file server 126 in the first data center 102 (e.g., by assuming the first file server's 126 network address), as coordinated by the intelligent controller 108.

In a third scenario, the system 100 may receive information indicating that the first data storage unit 130 has become disabled. In response, the system 100 may activate the second data storage unit 132.

In a fourth scenario, the system 100 may receive information indicating that the entire first data center 102 has failed, or potentially that one or more of the servers in the collection of servers 110 has failed. In response, the system 100 may activate the resources of the entire second data center 104. This may be performed by redirecting a user's communication session to the second data center 104. The director 106 may perform this function under the instruction of the intelligent controller 108 (or other appropriate managing agent).

Additional failure conditions may prompt the system 100 to activate or fail over to additional standby resources, or combinations of standby resources.

In step 408, the intelligent controller 108 determines whether the failure conditions warrant changing the routing of data through the fabric switch 124. For instance, with reference to FIG. 1, the first file server 126 may normally communicate with the first data storage unit 130 via the fabric switch 124 using the route defined by the combination of paths (1) and (7), and/or (8) and (2). If a failure is detected in the first data storage unit 130, the intelligent controller 108 may modify the coupling provided by the fabric switch 124 such that the first file server 126 now communicates with the second data storage unit 132 by the route defined by the paths (1) and (5), and/or (6) and (2). On the other hand, other disaster recover measures may not require making changes to the coupling provided by the fabric switch 124. For example, the system 100 may fail over from one data mover to another data mover within the first data center 102. This may not require making routing changes in the fabric switch 124 because this change is internal to the first file server 128. Nevertheless, as discussed above, the intelligent controller 108 may serve a role in coordinating this fail over.

In step 410, the intelligent controller 108 (or other appropriate managing agent) again assesses the failure conditions affecting the system 100. In step 412, the intelligent controller 108 determines whether the failure condition assessed in step 410 is different from the failure condition assessed in step 402. For instance, in step 402, the intelligent controller 108 may determine that only one data mover has failed. But subsequently, in step 410, the intelligent controller 108 may determine that the entire first file server 126 has failed. Alternatively, in step 410, the intelligent controller 108 may determine that the failure assessed in step 402 has been rectified.

In step 414, the intelligent controller 108 determines whether the failure assessed in step 402 has been rectified. If so, in step 416, the system restores the system 100 to its normal operating state. The intelligent controller 108 then waits for the occurrence of the next failure condition (e.g., via the steps 402 and 404). In one embodiment, a human administrator may initiate recovery at his or her discretion. For instance, an administrator may choose to perform recovery operations during a time period in which traffic is expected to be low. In other embodiments, the system 100 may partially or entirely automate recovery operations. For example, the intelligent controller 108 may trigger recovery operations based on sensed traffic and failure conditions in the network environment.

If the failure has not been rectified, this means that the failure conditions affecting the system have merely changed (and have not been rectified). If so, the system 100 advances again to step 406, where the intelligent controller 108 activates a different set of resources appropriate to the new failure condition (if this is appropriate).

The above-described architecture and associated functionality may be applied to any type of network service that may be accessed by any type of network users. For instance, the service may be applied to a network service pertaining to the financial-related fields, such as the insurance-related fields.

The above-described technique provides a number of benefits. For instance, the use of a fabric switch 124 in conjunction with an intelligent controller 108 provides a highly flexible and well-coordinated technique for handling failure conditions within a network infrastructure, resulting in an efficient utilization of standby resources. In preferred embodiments, the users may be unaware of disturbances caused by such failure conditions.

Figure 5:
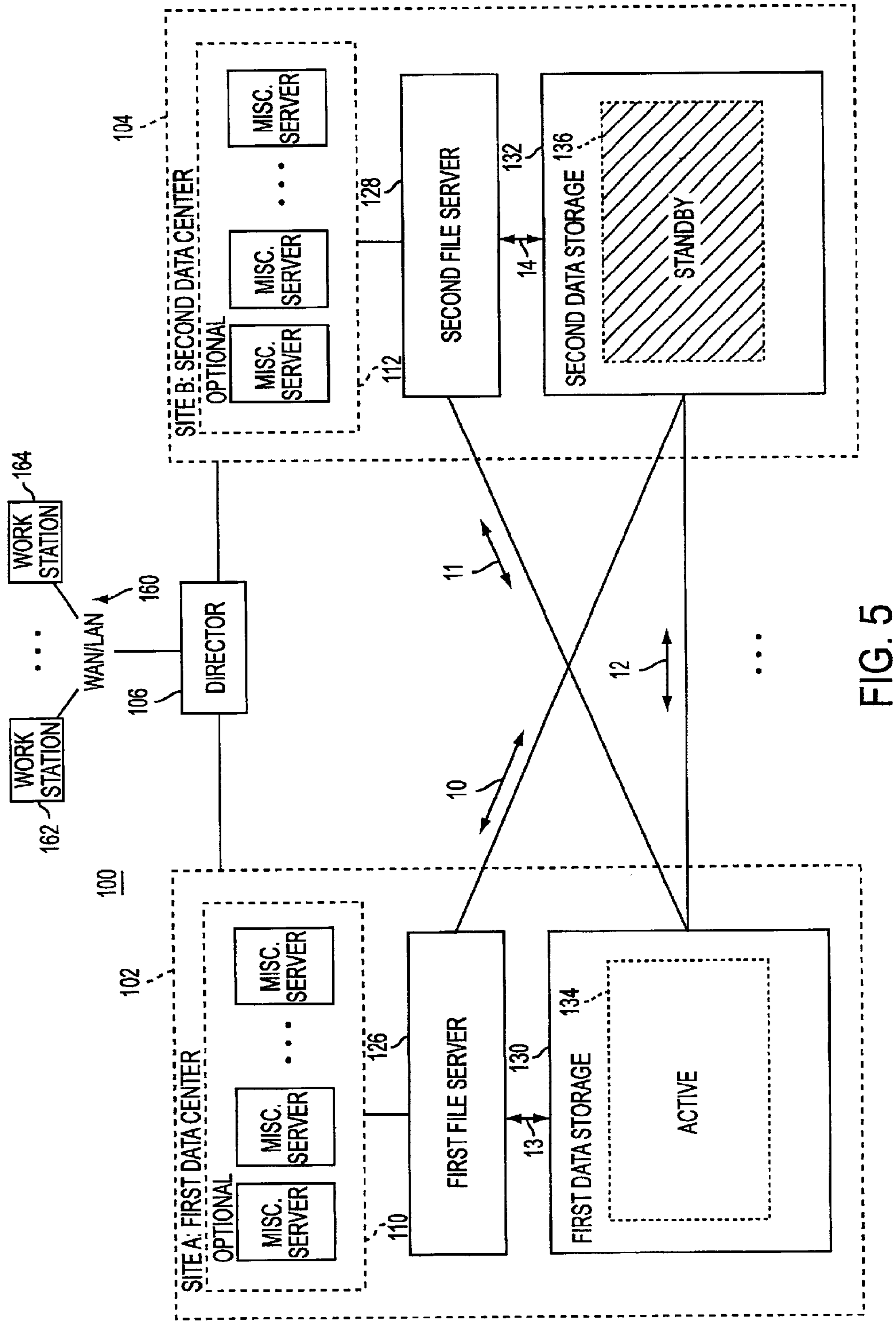
FIG. 5 shows an alternative system for implementing the present invention which omits the fabric switch and intelligent controller shown in FIG. 1.

The system 100 may be modified in various ways. For instance, FIG. 5 shows an embodiment which omits the intelligent controller 108 and associated fabric switch 124. In this case, the first file server 126 is coupled to the second data storage unit 132 via path (10), the second data file server 128 is coupled to the first data storage unit 130 via the path (11), and the first data storage unit 130 is coupled to the second data storage unit 132 via path (12). The links (10), (11) and (12) may comprise any type of physical links implemented using any type of protocols. Further, the first file server 126 may be coupled to the first data storage unit 130 via a direct connection (13) (e.g., through SCSI links). In addition, the second server 128 may be coupled to the second data storage unit 132 via direct connection (14) (e.g., through SCSI links). In this embodiment, local control logic within the data centers (102, 104) determines the routing of information over paths (10) through (14). In other words, this embodiment transfers the analysis and routing functionality provided by the intelligent controller 108 of FIG. 1 to control logic that is local to the data centers.

Additional modifications are envisioned. For instance, the above discussion was framed in the context of two data centers. But, in alternative embodiments, the system 100 may include additional data centers located at additional sites.

Further, the above discussion was framed in the context of identically-constituted first and second data centers. However, the first data center 102 may vary in one or more respects from the second data center 104. For instance, the first data center 102 may include processing resources that the second data center 104 lacks, and vice versa. Further, the first data center 102 may include data content that the second data center 104 lacks, and vice versa.

Further, the above discussion was framed in the context of automatic assessment of failure conditions in the network infrastructure. But, in an alternative embodiment, the detection of failure conditions may be performed in whole or in part based on human assessment of failure conditions. That is, administrative personnel associated with the network service may review traffic information regarding ongoing site activity to assess failure conditions or potential failure conditions. The system 100 may facilitate the administrator's review by flagging events or conditions that warrant the administrator's attention (e.g., by generating appropriate alarms or warnings of impending or actual failures).

Further, in alternative embodiments, administrative personnel may manually reallocate system resources depending on their assessment of the traffic and failure conditions. That is, the system 100 may be configured to allow administrative personnel to manually transfer a user's communication session from one data center to another, or perform partial (component-based) reallocation of resources on a manual basis.

Other modifications to the embodiments described above can be made without departing from the spirit and scope of the invention, as is intended to be encompassed by the following claims and their legal equivalents.

What is claimed is:

1. A system for providing access to resources, comprising:

a first data center for providing a network service at a first geographic location, including:

a first file server for providing access to resources;

a first data storage unit including active resources configured for active use;

a second data center for providing the network service at a second geographic location, including:

a second file server for providing access to resources;

a second data storage unit including standby resources configured for standby use in the event that the active resources cannot be obtained from the first data storage unit;

a switching mechanism for providing communicative connectivity to the first file server, second file server, first data storage unit, and second data storage unit;

failure sensing logic for sensing a failure condition in at least one of the first and second data centers, and generating an output based thereon; and an intelligent controller coupled to the switching mechanism for controlling the flow of data through the switching mechanism, and for coordinating fail over operations, based on the output of the failure sensing logic, the intelligent controller including: logic for coupling the first file server to the second data storage unit when a failure condition is detected pertaining to the first data storage unit.

2. The system of claim 1, wherein the intelligent controller includes:

logic for coupling the first file server to the first data storage unit in the absence of a detected failure condition.

3.The system of claim 1, wherein the first file server includes:

a plurality of active data movers for providing access to respective storage unit modules;

a plurality of standby data movers associated with respective active data movers; and a control module for activating a standby data mover associated with at least one active data mover when a failure condition is detected in the at least one active data mover, as coordinated by the intelligent controller.

4.The system of claim 1, wherein the intelligent controller further includes:

logic for sensing a failure condition affecting the entirety of the first data center, and for coordinating the activation of the second data center in response thereto.

5. The system of claim 1, wherein the first data storage unit further includes replication logic for transmitting changes made in the first data storage unit to the second data storage unit.

6. The system of claim 5, wherein the intelligent controller includes:

logic for coupling the first data storage unit to the second data storage unit to serve as a communication route for transmitting changes made in the first data storage unit to the second data storage unit.

7. The system of claim 6, wherein the first data center and the second data center are coupled to at last one user access device via a wide area network.

8. The system of claim 1, wherein the switching mechanism comprises a fiber-based fabric switch.

9. The system of claim 1, the switching mechanism comprises a WAN-based fabric switch.

10. A method for providing access to resources using a system including first and second data centers for providing a network service at first and second geographic locations, respectively, wherein the first data center includes a first file server for providing access to resources, and a first data storage unit including active resources configured for active use, and wherein the second data center includes a second file server for providing access to resources, and a second data storage unit including standby resources configured for standby use in the event that the active resources cannot be obtained from the first data center, comprising the steps of:

routing communication between the first file server and the first data storage unit using a fabric switching mechanism;

determining whether a failure condition has occurred;

analyzing the failure condition, and determining, using an intelligent controller, whether the failure condition warrants re-routing communication through the fabric switching mechanism; and re-routing communication through the fabric switching mechanism if the intelligent controller deems that this is warranted and coupling the first file server to the second data storage unit when a failure condition is detected pertaining to the first data storage unit.

11. The method of claim 10, wherein the first file server includes a plurality of active data movers for providing access to respective storage unit modules, and a plurality of standby data movers associated with respective active data movers, and wherein the method further includes a step of activating a standby data mover associated with at least one active data mover when a failure condition is detected in the at last one active data mover.

12. The method of claim 10, further including a step of sensing a failure condition affecting the entirety of the first data center, and for activating the second data center in response thereto.

13. The method of claim 10, further including a step of transmitting changes made in the first data storage unit to the second data storage unit.

14. The method of claim 13, wherein the step of transmitting include transmitting the changes via the switching mechanism.

15. The method of claim 10, wherein the first data center and the second data center are coupled to at least one user access device via a wide are network.

16. The method of claim 10, wherein the switching mechanism comprises a fiber-based fabric switch.

17. The method of claim 10, wherein the switching mechanism comprises a WAN-based fabric switch.

18. A system for providing access to resources over a wide area network, comprising:

a first data center coupled to the wide area network for providing a network service at a first geographic location, including:

a first file server for providing access to resources;

a first data storage unit including active resources configured for active use;

a second data center coupled to the wide area network for providing the network service at a second geographic location, including:

a second file server for providing access to resources;

a second data storage unit including standby resources configured for standby use in the event that the active resources cannot be obtained from the first data center;

a fabric switching mechanism for providing communicative connectivity to the first server, second server, first data storage unit, and second data storage unit;

failure sensing logic for sensing a failure condition in at least one of the first and second data centers, and for generating an output based thereon; and an intelligent controller, coupled to the wide area network, and also coupled to the switching mechanism for controlling the flow of data through the switching mechanism, and for coordinating fail over operations, based on the output of the failure sensing logic;

wherein the intelligent controller includes;

logic for coupling the first file server to the first data storage unit in the absence of a detected failure condition, and for coupling the first file server to the second data storage unit when a failure condition is detected pertaining to the first data storage unit.

19. A method for providing access to resources over a wide area network using a system including first and second data centers for providing a network service at first and second geographic locations, respectively, wherein the first data center includes a first file server for providing access to resources, and a first data storage unit including active resources configured for active use, and wherein the second data center includes a second file server for providing access to resources, and a second data storage unit including standby resources configured for standby use in the event that the active resources cannot be obtained from the first data center, comprising the steps of:

routing communication between the first file server and the first data storage unit using a fabric switching mechanism;

determining whether a failure condition has occurred;

analyzing the failure condition, and determining, using an intelligent controller, whether the failure condition warrants re-muting communication within the system; and re-routing communication through the switching mechanism if the intelligent controller deems this warranted, wherein the step of re-routing includes coupling the first file server to the second data storage unit when a failure condition is detected pertaining to the first data storage unit.

* * * * *